(12) United States Patent
Gao et al.

(10) Patent No.: US 8,902,784 B2
(45) Date of Patent: Dec. 2, 2014

(54) METHOD AND APPARATUS FOR TRANSMITTING ACK/NACK FEEDBACK INFORMATION

(75) Inventors: Xuejuan Gao, Beijing (CN); Zukang Shen, Beijing (CN); Yanan Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 92 days.

(21) Appl. No.: 13/703,629

(22) PCT Filed: Sep. 30, 2011

(86) PCT No.: PCT/CN2011/080427
§ 371 (c)(1),
(2), (4) Date: Feb. 28, 2013

(87) PCT Pub. No.: WO2012/051904
PCT Pub. Date: Apr. 26, 2012

(65) Prior Publication Data
US 2013/0208633 A1    Aug. 15, 2013

(30) Foreign Application Priority Data
Oct. 18, 2010    (CN) .......................... 2010 1 0517313

(51) Int. Cl.
*H04J 1/16* (2006.01)
*H04W 72/04* (2009.01)
*H04L 5/00* (2006.01)
*H04L 1/18* (2006.01)

(52) U.S. Cl.
CPC ........... *H04W 72/0413* (2013.01); *H04L 5/001* (2013.01); *H04L 1/1861* (2013.01); *H04L 5/0055* (2013.01)

USPC .......................................... 370/252; 370/335

(58) Field of Classification Search
USPC ........................................ 370/280, 252, 335
See application file for complete search history.

(56) References Cited

U.S. PATENT DOCUMENTS

2008/0225822 A1*    9/2008    Zhang et al. .................. 370/343
2010/0124194 A1*    5/2010    Chun et al. ..................... 370/329

FOREIGN PATENT DOCUMENTS

CN          101686108       3/2010
WO          2010/099653     9/2010

OTHER PUBLICATIONS

CATT, Design of Mapping Tables for PUCCH Format 1b with Channel Selection, R11-105154, 3GPP TSG RAN WG1 Meeting #62bis, Xi'an, China, Oct. 11-15, 2010, [Getdate: Dec. 14, 2011], obtained from internet: URL: http://www.3gpp.org/ftp/tsg_ran/WG1_RL1/TSGR1_62b/Docs/R1-105154.zip.

(Continued)

*Primary Examiner* — Sai-Ming Chan
(74) *Attorney, Agent, or Firm* — Ladas & Parry, LLP

(57) ABSTRACT

Disclosed are a method and an apparatus for transmitting ACK/NACK feedback information. By applying the technical solution of the present invention, when ACK/NACK feedback information is transmitted based on an ACK/NACK mapping table with a PUCCH format 1b with channel selection scheme, the problem of inconsistent detection results due to inconformity of the transmission scheme by a base station and a user equipment (UE) in the process of feeding back the ACK/NACK feedback information can be avoided, so as to implement a rollback of LTE Rel-8 PUCCH format 1a/1b.

15 Claims, 4 Drawing Sheets

(56) References Cited

OTHER PUBLICATIONS

Panasonic, mapping Tables for Format 1b with Channel Selection, R1-105476, 3GPP TSG RAN WG1 Meeting #62bis, Xi'an, China, Oct. 11-15, 2010, [Getdate: Dec. 14, 2011], obtained from internet: URL: http://www.3gpp.org/ftp/tsg_ran/WG1_RL1/TSGR1_62b/Docs/R1-105476.zip.

Huawei et al., ACK/NACK mapping tables for channel selection, R1-105245, 3GPP TSG RAN WG1 Meeting #62bis, Xi'an, China, Oct. 11-15, 2010, [Getdate: Dec. 14, 2011], obtained from internet: <URL: http://www.3gpp.org/ftp/tsg_ran/WG1_RL1/TSGR1_62b/Docs/R1-105245.zip>.

ISR for related PCT/CN2011/080427 mailed on Jan. 5, 2012.

PCT International Preliminary Report on Patentability Chapter I (with Written Opinion) from PCT/CN2011/080427 dated Apr. 23, 2013, and its English translation.

* cited by examiner

METHOD AND APPARATUS FOR TRANSMITTING ACK/NACK FEEDBACK INFORMATION

CROSS REFERENCE TO RELATED APPLICATIONS

This application is the U.S. national stage of international patent application no. PCT/CN2011/080427 filed on Sep. 30, 2011, which claims priority to Chinese patent application no. 201010517313.6 entitled "Method and Apparatus for Transmitting ACK/NACK Feedback Information" filed in the patent office of the People's Republic of China on Oct. 18, 2010, the disclosures of which are incorporated by reference herein.

FIELD OF THE INVENTION

The present invention relates to the field of communication technology, in particular to a method and an apparatus for transmitting ACK/NACK feedback information.

BACKGROUND OF THE PRESENT INVENTION

For LTE-A (Long Term Evolution Advanced), to support system bandwidths wider than LTE (Long Term Evolution), for example 100 MHz, one possibility is to directly distribute a frequency spectrum with a bandwidth of 100M as shown in FIG. 1; the other possibility is to aggragate some spectra distributed to the present systems so as to form large bandwidths for long-term evolution multicarrier systems. Uplink and downlink carriers in the system can be arranged asymmetrically at this time, that is to say, a user will conduct downlink transmission through occupying N≥1 carriers and uplink transmission through occupying M≥1 carriers as shown in FIG. 2.

An LTE-A system can support 5 carriers at most to aggregate at present. An LTE-A user equipment (UE) needs to feed back the information on Acknowledgement (ACK)/Negative Acknowledgement (NACK) of a plurality of downlink carriers and downlink subframes in the same uplink subframe. In the LTE-A system, a transmission scheme of PUCCH (Physical Uplink Control Channel) Format 1b with channel selection can be adopted for ACK/NACK feedback information less than 4 bits. For a FDD (Frequency Division Duplex) system, the typical application scene of this scheme refers to the aggregation of 2 carriers.

PUCCH Format 1b with channel selection differentiates different statuses of ACK/NACK feedback information through selecting and transmitting a plurality of channel resources via UE. ACK/NAK mapping table is used to realize the mapping among ACK/NACK feedback information to be fed back, actual channel transmission information (namely 4 constellation points modulated by PUCCH format 1b QPSK), and transmission channels. For ACK/NACK feedback with 2, 3 and 4 bits, 2, 3 and 4 uplink control channel resources are required respectively.

In an LTE system, all channel resources used for ACK/NACK transmission through PUCCH Format 1b with channel selection refer to implicit channel resources. The implicit channel resources mean uplink control channel resources reserved in control information areas of a fixed downlink carrier corresponding to an uplink carrier. The minimum unit of the control information area is CCE (Control Channel Element). UE can acquire an available uplink control channel resource through a minimum CCE number of each downlink control signaling sent on the downlink carrier. Such uplink control channel resource is abbreviated to "implicit channel resources" or "dynamic channel resource".

In an LTE-A system, implicit channel resources on each UL CC (Uplink Component Carrier) are reserved only for a PDCCH (Physical Downlink Control Channel) paired with a DL CC (Downlink Component Carrier), while the PUCCH can be sent only on a UL PCC (Uplink Primary Component Carrier). Thus for a UE equipment, implicit channel resources only exsit on a UL PCC. In consideration that the UL PCC reserves resources only for a DL PCC (Downlink Primary Component Carrier), implicit channel resources only exsit on the PDCCH sent on a DL PCC. Thus not all channel resources required for PUCCH format 1b with channel selection are acquired from implicit channel resources.

It is necessary to design new ACK/NACK mapping table in the LTE-A system to meet the following requirements:

(1) Try to use the implicit resources reserved on UL PCCs to reduce the consumption on uplink control channel resources;

(2) Be applicable to inter-carrier dispatching and non-inter-carrier dispatching simultaneously to reduce standard complexities;

(3) Avoid many-to-one state in an ACK/NACK mapping table in LTE system;

(4) Be capable of solving the ambiguities during DL CC reconfiguration or when data packet scheduling only exists on a DL PCC, that is to say, a rollback of the PUCCH format 1a/1b transmission method in LTE Rel-8 can be implemented when UE receives data packet transmission only on the DL PCC (preferably, a base station sends the downlink data of a subframe only on the DL PCC during DL CC reconfiguration; or UE configures a plurality of DL CCs, while the base station dispatches data packets of a subframe only on the DL PCC). Meanwhile, it is necessary to ensure that QPSK constellation points and channel resources used for ACK/NACK transmission through a PUCCH format 1b with channel selection scheme are consistent with QPSK modulation symbols (or named constellation points) and channel resources used by ACK/NACK corresponding to the transmission of a data packet on main carrier by PUCCH format 1a/1b.

When an LTE-A Rel-10 system supports the rollback of Rel-8 PUCCH format 1a/1b transmission, the inconformity of UE and eNB (evolved NodeB, namely a base station) on a transmission scheme actually adopted by the UE should be solved, which comprises:

Condition 1: When the effective time of an eNB is different from that of UE during DL CC reconfiguration, the inconformity of the eNB and UE on the configuration number of DL CCs may exist.

For example, when the number of CC reduces from two to one during DL CC configuration by UE, eNB dispatches one codeword on a DL PCC and expects to adopt PUCCH format 1a on the UL PCC (FDD system: transmission with single codeword or a plurality of codewords with one dispatched codeword; or TDD system: transmission with single codeword or a plurality of codewords with one dispatched codeword) to receive one-bit ACK/NACK feedback information or adopt PUCCH format 1b (FDD system: transmission with a plurality of codewords with two dispatched codewords; or TDD system: transmission with a plurality of codewords with two dispatched codewords) to receive two-bit ACK/NACK feedback information.

However, before taking into effect, UE will still work under 2DL CC configuration, generate ACK/NACK feedback bits according to 2CC configuration and adopt a PUCCH format 1b with channel selection scheme on a UL PCC to transmit ACK/NACK feedback information. If QPSK modulation symbols and transmission channels determined after channel selection by UE are inconsistent with PUCCH format 1a/1b, an eNB cannot receive ACK/NACK information correctly. On the contrary, when the number of CC increases from one to two during DL CC configuration by the UE, the inconformity mentioned above will still exsit.

Condition 2: When UE configures a plurality of DL CCs, while an eNB only dispatches on a DL PCC, the inconformity of eNB and the UE on the actual transmission scheme of the UE will exsit.

For example, when an eNB only dispatches the data packet transmission of a subframe on a DL PCC, the eNB expects to adopt PUCCH format 1a (single-codeword dispatching)/1b (multi-codeword dispatching) on the UL PCC to receive ACK/NACK feedback information.

However, UE configuration is conducted on two DL CCs. Thus regardless of the number of DL CC where UE receives data packets, UE will generate ACK/NACK feedback bits according to 2CC configuration and adopt a PUCCH format 1b with channel selection scheme to transmit ACK/NACK feedback information on a UL PCC. If QPSK modulation symbols and transmission channels determined after channel selection by the UE are inconsistent with PUCCH format 1a/1b, an eNB cannot receive ACK/NACK information correctly.

To solve the above problems, it is necessary to ensure that ACK/NACK mapping table design meets the condition that transmission channels and modulation symbols corresponding to ACK/NACK feedback status during downlink transmission of a subframe on a DL PCC should coincide with PUCCH format 1a/1b.

TABLE 1

Mapping Table of 2-bit ACK/NACK Feedback Information

| ACK/NACK feedback status | | Channel 1 $(n_{PUCCH,0}^{(1)})$ | | Channel 2 $(n_{PUCCH,1}^{(1)})$ | |
| --- | --- | --- | --- | --- | --- |
| DL PCC | DL SCC | RS | Data | RS | Data |
| A | A | | | 1 | −1 |
| A | N/DTX | 1 | −1 | | |
| N/DTX | A | | | 1 | 1 |
| N | N/DTX | 1 | 1 | | |

In the mapping table of 3-bit ACK/NACK of a FDD system as shown in Table 2, DL PCC of the parts with background colors refers to mapping methods in multi-codeword mode. At this time, a rollback of PUCCH format 1b can be supported in 4 statuses with background colors (that is to say, QPSK symbols and the selected channels are consistent with PUCCH format 1b), while a rollback of PUCCH format 1a cannot be supported (that is to say, QPSK symbols and the selected channels are inconsistent with PUCCH format 1a); DL PCC of bold parts refers to mapping methods in single-codeword mode. At this time, 2 bold statuses can support a rollback of PUCCH format 1a (that is to say, QPSK symbols and the selected channels are consistent with PUCCH format 1a).

TABLE 2

Mapping Table of 3-bit ACK/NACK Feedback Information

| ACK/NACK feedback status | | Channel 1 $(n_{PUCCH,0}^{(1)})$ | | Channel 2 $(n_{PUCCH,1}^{(1)})$ | | Channel 3 $(n_{PUCCH,2}^{(1)})$ | |
| --- | --- | --- | --- | --- | --- | --- | --- |
| DL PCC (milti-codeword) or DL SCC(multi-codeword) | DL SCC(single codeword) or DL PCC (single codeword) | RS | Data | RS | Data | RS | Data |
| ... | ... | | | | | | |
| A, A | DTX | 1 | -1 | | | | |
| A, N | DTX | 1 | j | | | | |
| N, A | DTX | 1 | -j | | | | |
| N, N | DTX | 1 | 1 | | | | |
| DTX | A | | | | | 1 | -1 |
| DTX | N | | | | | 1 | 1 |
| ... | ... | | | | | | |

In the mapping table of 2-bit ACK/NACK of a FDD system as shown in Table 1, two channel resources are used to conduct channel selection and a rollback of PUCCH format 1b cannot be supported (that is to say, the selected channels may be inconsistent with PUCCH format 1b, for example, channel 2 is selected). While a rollback of PUCCH format 1a can be supported in 2 statuses with background colors (that is to say, QPSK symbols and the selected channels are consistent with PUCCH format 1a).

In the mapping table of 4-bit ACK/NACK of a FDD system as shown in Table 3, DL PCC refers to mapping methods in multi-codeword mode. At this time, a rollback of PUCCH format 1b can be supported in 4 bold statuses (that is to say, QPSK symbols and the selected channels are consistent with PUCCH format 1b); while a rollback of PUCCH format 1a cannot be supported (that is to say, QPSK symbols and the selected channels are inconsistent with PUCCH format 1a).

TABLE 3

Mapping Table of 4-bit ACK/NACK Feedback Information

| ACK/NACK feedback status | | Channel 1 $(n_{PUCCH,0}^{(1)})$ | | Channel 2 $(n_{PUCCH,1}^{(1)})$ | | Channel 3 $(n_{PUCCH,2}^{(1)})$ | | Channel 4 $(n_{PUCCH,4}^{(1)})$ | |
|---|---|---|---|---|---|---|---|---|---|
| DL PCC | DL SCC | RS | Data | RS | Data | RS | Data | RS | Data |
| A, A | DTX | 1 | −1 | | | | | | |
| A, N | DTX | 1 | j | | | | | | |
| N, A | DTX | 1 | −j | | | | | | |
| N, N | DTX | 1 | 1 | | | | | | |

Wherein, the character A in Table 1, 2 and 3 represents ACK, and the character N represents NACK.

The feedback information of a downlink carrier corresponding to UE includes ACK (correctly-received data packets), NACK (incorrectly-received data packets) and DTX (Discontinuous Transmission, namely lost or non-dispatched data packets).

At present, ACK/NACK feedback information bits fed back by UE is determined based on the configured downlink carriers and transmission modes of each downlink carrier in the LTE-A FDD system, that is to say, it is necessary for the UE to feed back ACK/NACK with $$\sum_{i=1}^{N} C_i \cdot N$$

bits on an uplink subframe, wherein $C_i$ represents codeword number of each downlink carrier (C=1 during single-codeword transmission and C=2 during multi-codeword transmission), different transmission modes (namely codeword number) can be used for different downlink carriers), and N represents the number of downlink carriers configured by the UE.

For a FDD system, when the multi-codeword transmission mode is used for a DL CC, namely MIMO (Multiple-Input Multiple-Out-put) transmission mode, it is necessary for UE to separately generate ACK/NACK feedback information with 1 bit no matter 2-codeword dispatching exsits on the DL CC actually. For the DL CC with only one-codeword transmission in MIMO transmission mode, it is necessary for the UE to generate a supposed ACK/NACK feedback status for the second codeword so as to meet the total number as $$\sum_{i=1}^{N} C_i$$

of ACK/NACK bits fed back by the UE. In LTE Rel-8 system, the UE generates NACK information for non-dispatched data packets/codeword positions.

During implementation of the embodiments of the present invention, the applicant finds that the following problems at least exist in the prior art:

In LTE-A Rel-10 system, when MIMO transmission mode is configured on PCC for UE, while one-codeword dispatching only exists on a DL PCC actually, a rollback of PUCCH format 1a should be supported to conduct 1-bit ACK/NACK transmission. In PUCCH format 1a, an ACK feedback status corresponds to the modulation symbol "−1", and a NACK feedback status corresponds to the modulation symbol "1". If NACK information is generated in the non-dispatched codeword position in accordance with LTE Rel-8 mode, the corresponding transmission symbol refers to "j" as shown in Table 1 and 2 rather than "−1" corresponding to PUCCH format 1a when the UE receives a codeword only on a DL PCC and ACK/NACK feedback information corresponding to the DL PCC generated by the UE refers to [A,N]. Therefore, a rollback of PUCCH format 1a cannot be realized.

At present, there are no corresponding solutions in the prior art.

SUMMARY OF THE INVENTION

The embodiments of the present invention provide a method and an apparatus for transmitting ACK/NACK feedback information to implement a rollback of LTE Rel-8 PUCCH format 1a/1b transmission scheme during DL CC reconfiguration or when dispatching only exists on a DL PCC in an LTE-A system.

To achieve the above purposes, the embodiments of the present invention also provide a method for transmitting ACK/NACK feedback information with multiple bits, which comprises:

When receiving only one codeword on the main downlink component carrier configured as the multi-codeword transmission mode, the UE will receive 1-bit ACK/NACK feedback information of the one received codeword, and repeat the 1-bit ACK/NACK feedback information to 2 bits as ACK/NACK feedback bits corresponding to downlink main component carriers;

The UE acquires the ACK/NACK feedback bit corresponding to downlink auxiliary component carriers of each configuration;

The UE sends the ACK/NACK feedback bit corresponding to downlink component carriers of each configuration.

Besides, the embodiments of the present invention also provide the UE, which comprises:

An acquisition module, which is used to acquire 1-bit ACK/NACK feedback information of the one received codeword and repeat the 1-bit ACK/NACK feedback information to 2 bits as ACK/NACK feedback bits corresponding to downlink main component carriers when UE receives only one codeword on the main downlink component carrier configured as multi-codeword transmission mode; and is also used to acquire ACK/NACK feedback bits corresponding to downlink auxiliary component carriers of each configuration.

A sending module, which is used to send the ACK/NACK feedback bit corresponding to downlink component carriers of each configuration acquired by the acquisition module.

Compared with the prior art, the embodiments of the present invention have the following advantages:

By applying the technical solution of the present invention, when ACK/NACK feedback information is transmitted based on an ACK/NACK mapping table with a PUCCH format 1b with channel selection scheme, the problem of inconsistent detection results due to inconformity of the transmission scheme by a base station and a UE (UE) during the feedback of ACK/NACK feedback information can be avoided, so as to implement a rollback of LTE Rel-8 PUCCH format 1a/1b.

DETAILED DESCRIPTION OF PREFERRED EMBODIMENTS

As shown in the background art, in the LTE-A (CA, carrier aggregation) system, PUCCH Format 1b with channel selection is determined as a scheme for ACK/NACK multiplexing transmission at present.

When UE dispatches only on downlink main component carriers, an LTE-A system can fall back to a method for transmitting ACK/NACK with single carrier in an LTE Rel-8 system, which is equivalent to transmit ACK/NACK by PUCCH format 1a/1b.

To meet the demands for backward compatibility, it is necessary to design a new ACK/NACK mapping table for an LTE-A system. The table should meet the condition that in a DTX status of data packets on a DL SCC, modulation symbols actually transmitted by PUCCH format 1b with channel selection and the used transmission channels are consistent with PUCCH format 1a/1b, thus avoiding the inconsistence of detection results between the UE and eNB.

In consideration that two transmission modes with single codeword and multiple codewords may exist on a DL PCC, it is necessary to generate ACK/NACK on the DL PCC based on different DL PCC transmission modes so as to realize a rollback.

Based on the above reasons, the embodiments of the present invention provide a method for transmitting ACK/NACK feedback information based on an ACK/NACK mapping table with PUCCH format 1b with channel selection scheme.

Figure 3:
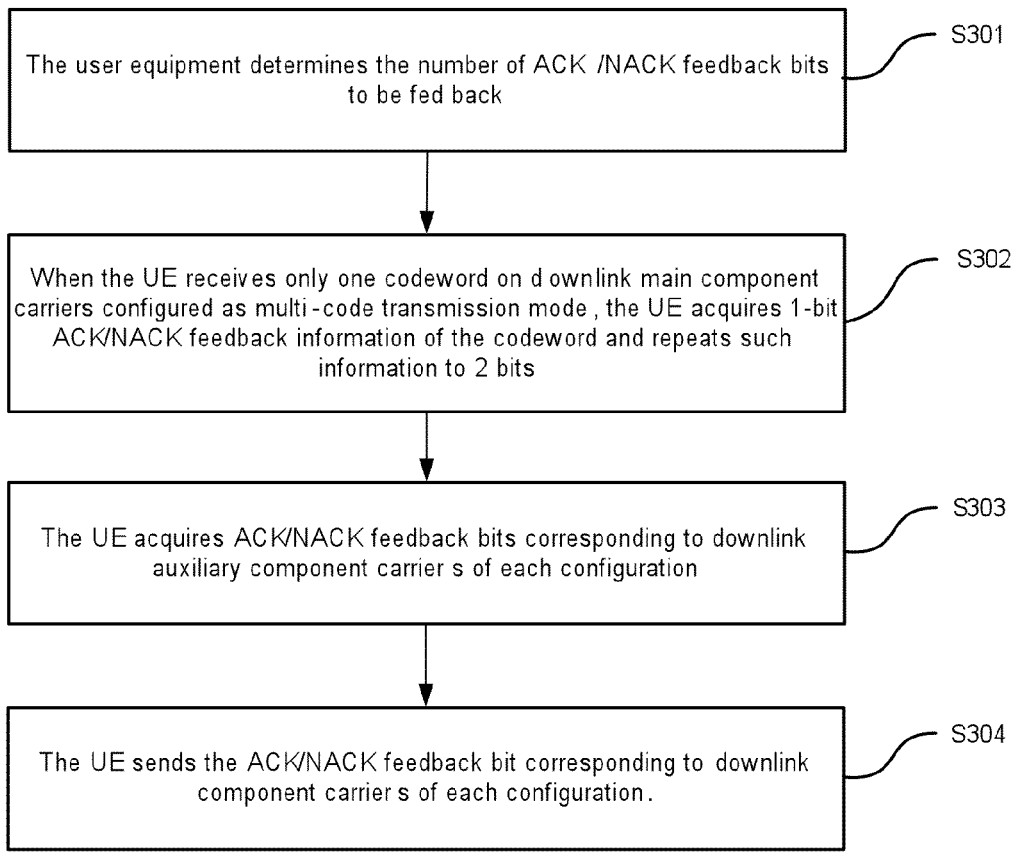
FIG. 3 is a flow diagram of a method for transmitting ACK/NACK feedback information proposed by the embodiments of the present invention.

FIG. 3 is a flow diagram of a method for transmitting ACK/NACK feedback information proposed by the embodiments of the present invention, which comprises the following steps:

Step S301: UE determines the number of ACK/NACK feedback bits to be fed back.

This step is mainly used to ensure the consistency of bit number of ACK/NACK feedback information to be fed back on UE side and a network side, thus avoiding fuzzy information.

In this step, the following two conditions exist in specific realization process according to system type differences:

(1) For a FDD system, UE determines the number of ACK/NACK feedback bits to be fed back in accordance with the number of the configured downlink component carriers and the transmission mode of downlink carriers of each configuration.

(2) For a TDD system, UE determines the number of ACK/NACK feedback bits to be fed back in accordance with the number of the configured downlink component carriers, the number of downlink subframes of ACK/NACK feedback bits to be fed back corresponding to an uplink subframe and the transmission mode of downlink component carrier of each configuration.

It should be noted that in practical application, UE determines the number of ACK/NACK feedback bits to be fed back after the configuration or reconfiguration of transmission modes of downlink component carriers and downlink component carriers of each configuration. This number keeps unchanged after determination, that is to say, the UE always feeds back in accordance with the previously determined number of ACK/NACK feedback bits, unless when the signaling for reconfiguring the number of downlink carriers or transmission modes of downlink carriers received by the UE becomes effective, the number of ACK/NACK feedback bits to be fed back will be redetermined.

Step S302: When receiving only one codeword on downlink main component carriers configured as multi-codeword transmission mode, UE will acquire 1-bit ACK/NACK feedback information of the one received codeword and repeat such information to 2 bits as ACK/NACK feedback bits corresponding to downlink main component carriers.

Wherein, the codeword includes one-codeword transmission of dynamic dispatching and PDCCH transmission indicating downlink semi-persistent scheduling (SPS) resource release, that is to say, when the UE only receives a PDCCH indicating downlink SPS resource release on downlink main component carriers configured as multi-codeword transmission mode, the codeword mentioned above is equivalent to such PDCCH. The UE receives 1-bit ACK/NACK feedback information of the PDCCH which indicates downlink SPS resource release, and repeat the 1-bit ACK/NACK feedback information to 2 bits as ACK/NACK feedback bits corresponding to downlink main component carriers.

Wherein, a dynamic channel resource corresponding to the codeword (including PDCCH which indicates downlink SPS resource release) received by the UE are taken as the dynamic channel resource corresponding to downlink main component carriers in each channel resource used for channel selection by the UE; preferably, when downlink main component carriers are in multi-codeword transmission mode, dynamic channel resources are regarded as the first channel resources $n_{PUCCH,0}^{(1)}$ in the ACK/NACK mapping table.

In specific application scene, the aforementioned dynamic channel resource refers to one channel resource on an uplink main carrier determined by UE in accordance with a minimum CCE number of a PDCCH. The PDCCH is used to dispatch one codeword (including PDCCH that indicates downlink SPS resource release) received by the UE on the downlink main carrier, and transmitted on the downlink main component carrier of the UE.

It should be noted that DCI format 2/2A/2B/2C or DCI format 1A can be used to transmit a PDCCH when one codeword is dispatched on a downlink main component carrier. The changes on specific types will not affect the protective scope of the present invention.

It can be seen from the above methods and in combination with the aforementioned Table 2 and 3 that the copied ACK/NACK feedback information can ensure that QPSK modulation symbols and channel resources corresponding to ACK/NACK feedback statuses are consistent with PUCCH format 1a when PUCCH format 1b with channel selection is adopted, thus avoiding fuzzy information between UE and network side.

When UE receives two codewords on downlink main component carriers configured as multi-codeword mode at the same time, for fuzzy information will not appear, the UE will process in direct accordance with existing technical solution and acquire ACK/NACK feedback information corresponding to two dispatched codewords separately.

It needs to be noted that in the process, multi-codeword ACK/NACK feedback information is not generated with spatial bundling.

Step S303: UE acquires ACK/NACK feedback bits corresponding to downlink auxiliary component carriers of each configuration.

Wherein, the sum of the number of ACK/NACK feedback bits corresponding to each downlink auxiliary component carrier and 2-bit ACK/NACK feedback bits corresponding to each downlink main component carrier is equal to the number of ACK/NACK feedback bits to be fed back determined in Step S301.

This step can ensure the consistency of the number of ACK/NACK feedback bits to be fed back between UE and network side.

In this step, ACK/NACK feedback bits are generated by two methods:

Method I. Process in Accordance with the Prior Art

NACK or DTX feedback bits are generated by UE for downlink auxiliary component carrier without codeword of each configuration.

Specifically, 2-bit NACK or DTX is generated as feedback information for downlink auxiliary component carriers which are transmitted in multi-codeword mode; 1-bit NACK or DTX feedback bits are generated for downlink auxiliary component carriers which are transmitted in single-codeword mode.

Method II. Copy ACK/NACK Feedback Information

As similar to Step S302, when UE receives only one codeword on downlink auxiliary component carriers configured as multi-codeword transmission mode, such UE will acquire 1-bit ACK/NACK feedback information corresponding to downlink auxiliary component carriers of each configuration and repeat such information to 2 bits as ACK/NACK feedback bits corresponding to this downlink auxiliary component carrier.

It needs to be noted that in the process, multi-codeword ACK/NACK feedback information is not generated with spatial bundling.

Step S304: UE sends the acquired ACK/NACK feedback bits corresponding to downlink component carriers of each configuration.

UE determines one channel resource and corresponding modulation symbols among candidate channel resources according to the acquired ACK/NACK feedback bits corresponding to downlink component carriers of each configuration with a PUCCH format 1b with channel selection scheme; UE sends corresponding modulation symbols on a determined channel resource.

Wherein, the candidate channel resources at least include one dynamic channel resource corresponding to a PDCCH for dispatching downlink main component carriers, wherein, the PDCCH refers to the one for dispatching one codeword received on the downlink main component carriers or indicating downlink SPS resource release.

Preferably, the dynamic channel resource corresponds to a minimum CCE number of the PDCCH, that is to say, such resource is determined in accordance with a minimum CCE number of the PDCCH.

Preferably, the UE takes the dynamic channel resource corresponding to a minimum CCE number of the PDCCH as the first dynamic channel resource corresponding to downlink main component carriers among the candidate channel resources used for channel selection, that is to say, the UE takes the dynamic channel resource as the first channel resource among the candidate channel resources used for channel selection.

In specific application scene, the dynamic channel resource corresponds to a minimum CCE number of the PDCCH.

Compared with prior art, the embodiments of the present invention have the following advantages:

ACK/NACK feedback information can be transferred based on ACK/NACK mapping table through PUCCH format 1b with channel selection scheme upon applying technical solution of embodiment of the present invention to avoid inconsistent results detected due to inconformity on transmission scheme by the base station and user equipment in the process feeding back ACK/NACK feedback information to further realize rollback of LTE Rel-8 PUCCH format 1a/1b.

The technical solution put forward by the embodiments of the present invention will be explained in combination with actual application scene.

In an LTE-A system, for UE on which a plurality of downlink carriers are configured, when the UE feeds back M-bit ACK/NACK information with PUCCH Format 1b with channel selection, $2 \leq M \leq 4$ will be met, wherein, M refers to a positive integer. If multi-codeword transmission mode is adopted for downlink main component carriers and the dispatching & transmission of only one codeword exists (including that the transmission of one PDCCH indicating SPS resource release only exists), transmission process of ACK/NACK feedback information by the UE is as follows:

(1) Firstly, UE acquires one codeword dispatched on a DL PCC configured as multi-codeword transmission mode or 1-bit ACK/NACK feedback information corresponding to a PDCCH indicating SPS resource release, and repeats such information to 2 bits. The repeated 1-bit ACK/NACK feedback information means ACK/NACK feedback information of the non-dispatched codewords.

Wherein, the implicit (dynamic) channel resource corresponding to a codeword received on a DL PCC is taken as the channel resource corresponding to the DL PCC among M channel resources used for channel selection with PUCCH Format 1b with channel selection, wherein, the implicit channel resource corresponding to the codeword received on the DL PCC refers to an implicit channel resource on the UL PCC determined in accordance with the minimum CCE number of the PDCCH dispatching the transmission of such codeword on the DL PCC (if a DL PCC corresponds to 2 implicit channel resources, the implicit channel resource determined in accordance with the minimum CCE number of the PDCCH refers to the first channel resource corresponding to the DL PCC, namely $n_{PUCCH,0}^{(1)}$. DCI format 2/2A or DCI format 1A can be adopted for the PDCCH dispatching the transmission of such codeword on DCL PCC.

In the process, multi-codeword ACK/NACK feedback information is not generated with spatial bundling.

Moreover, when two codewords on a DL PCC are dispatched simultaneously, the UE acquires ACK/NACK feedback information of each codeword separately based on actual reception (by means of Rel-8).

(2) UE acquires M-bit to 2-bit ACK/NACK feedback information corresponding to DL SCC of each configuration, wherein, M refers to the number of ACK/NACK feedback bits determined by the UE in accordance with the configuration, and meets the condition, $2 \leq M \leq 4$. Supposing that N ($N \geq 2$) refers to the number of DL CC configured by the UE, the number of DL SCC during the process is N−1.

In the process, multi-codeword ACK/NACK feedback information is not generated with spatial bundling.

In the process, the method for determining the number of ACK/NACK feedback bits by UE is as follows:

As for a FDD system, the number of ACK/NACK feedback bits to be fed back is determined in accordance with the quantity of downlink component carriers configured and transmission mode of downlink carriers of each configuration;

For a TDD system, the number of ACK/NACK feedback bits to be fed back is determined in accordance with the quantity of the configured downlink component carriers, the quantity of downlink subframes requiring feed backing ACK/NACK feedback information corresponding to an uplink subframe, and transmission mode of downlink component carriers of each configuration.

Moreover, as similar to the above conditions, the generation of ACK/NACK feedback information in the process includes the following two conditions:

A. In accordance with the prior art, when UE cannot receive downlink data packets on a DL SCC, the UE will arrange ACK/NACK feedback information of each codeword on the DL CC in a NACK or DTX status.

B. In accordance with the process similar to a DL PCC, when the DL SCC is transmitted in multi-codeword mode, while UE receives only one codeword, the same scheme as the one for generating ACK/NACK on the DL PCC can be adopted, that is to say, 1-bit ACK/NACK feedback information of one received codeword is repeated as ACK/NACK feedback information of the non-dispatched codewords.

(3) UE sends M-bit ACK/NACK feedback information to be fed back with a PUCCH format 1b with channel selection scheme.

The process includes the following steps. UE selects a channel resource during actual transmission and a transmission modulation symbol (4 QPSK constellation points of PUCCH format 1b) for M-bit ACK/NACK feedback information to be fed back according to a M-bit ACK/NACK mapping table with a PUCCH format 1b with channel selection scheme, and sends corresponding modulation symbols on corresponding channel resources.

Preferably, the aforementioned scheme is applicable to a FDD system, and an uplink subframe where ACK/NACK feedback of only one downlink subframe is conducted on a carrier in a TDD system.

In specific application scene, the design of an ACK/NACK mapping table applied in the technical solution can be optimized based on 2 DL CCs.

Figure 4:
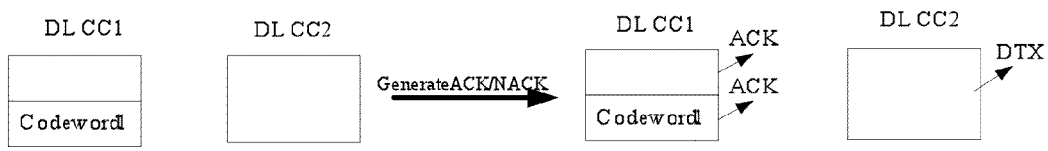
FIG. 4 is a flow diagram of a method for transmitting ACK/NACK feedback information in application scene I proposed by the embodiments of the present invention.

Furthermore, in combination with specific application scene, the application process of the aforementioned technical solution is described as followings:

Application scene I: During DL CC reconfiguration, 2 DL CCs to 1 DL CC is reconfigured for UE. As shown in the scene of FIG. 4, 2 DL CCs are configured for the UE initially. DL CC1 refers to a DL PCC, which is transmitted in multi-codeword mode. DL CC2 refers to a DL SCC, which is transmitted in single-codeword mode. An eNB dispatches only through bearing a PDCCH of DCI format 2, DCI format 2A, DCI format 2B or DCI format 2C on a DL PCC, and only dispatches codeword 1. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 3-bit ACK/NACK in accordance with the configuration of 2 DLCCs and the transmission mode of each DL CC; ACK/NACK feedback information of codeword 1 acquired by the UE on a DL PCC refers to ACK, then such information is repeated as the feedback information of the non-dispatched codeword 0, that is to say, the feedback information corresponding to codeword 0 also refers to ACK; if the UE cannot detect data packets on a DL SCC, ACK/NACK feedback information generated for the DL SCC refers to DTX and 3-bit ACK/NACK feedback information generated by the UE finally refers to [ACK, ACK, DTX]; the UE determines the implicit channel resource on a UL PCC through dispatching a minimum CCE number of a PDCCH on a DL PCC of codeword 1, such implicit channel resource is taken as the implicit channel resource corresponding to the DL PCC in an ACK/NACK mapping table, namely the first channel resource, $n_{PUCCH,0}^{(1)}$ as shown in Table 2; then the UE determines that the channel resource of ACK/NACK feedback information to be fed back refers to the first channel resource (namely the first implicit channel resource corresponding to a DL PCC) corresponding to the modulation symbol, "−1" in accordance with an ACK/NACK mapping table as shown in Table 2; finally, the UE sends the modulation symbol, "−1" on the implicit channel resource determined in accordance with the minimum CCE number of a PDCCH of dispatching codeword 1;

Base station end: The base station only dispatches one codeword 1 on a DL PCC, so the base station receives ACK/NACK feedback information with PUCCH format 1a. Since channel resource of PUCCH format 1a refers to the implicit channel resource on a UL PCC corresponding to a minimum CCE number of PDCCH dispatching codeword 1 and modulation symbol corresponding to ACK in PUCCH format 1a refers to "−1", that is to say, UE shares the same transmission channel and transmission modulation symbol with the base station actually, and fuzziness does not exist. The base station detects channel resource of PUCCH format 1a (viz. the implicit channel resource on a UL PCC corresponding to a minimum CCE number of PDCCH dispatching codeword 1) and modulation symbol "−1" sent by UE can be acquired, viz. feedback information ACK of codeword 1 sent by UE can be obtained.

Figure 5:
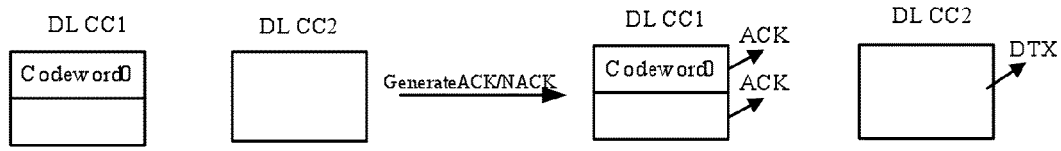
FIG. 5 is a flow diagram of a method for transmitting ACK/NACK feedback information in application scene II proposed by the embodiments of the present invention.

Application scene II: During DL CC reconfiguration, 2 DL CCs to 1 DL CC is reconfigured for UE. As shown in the site of FIG. 5, DL CC1 refers to a DL PCC, which is transmitted in multi-codeword mode. DL CC2 refers to a DL SCC, which is transmitted in single-codeword mode. An eNB only dispatches codeword 0 through bearing a PDCCH of DCI format 2, DCI format 2A, DCI format 2B or DCI format 2C or DCI format 1A on a DL PCC, and only dispatches codeword 0. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 3-bit ACK/NACK in accordance with the configuration of 2 DLCCs and the transmission mode of each DL CC; ACK/NACK feedback information of codeword 0 acquired by the UE on a DL PCC refers to ACK, then such information is repeated as the feedback information of the non-dispatched codeword 1, that is to say, the feedback information corresponding to codeword 1 also refers to ACK; if the UE cannot detect data packets on a DL SCC, ACK/NACK feedback information generated for the DL SCC refers to DTX and 3-bit ACK/NACK feedback information generated by the UE finally refers to [ACK, ACK, DTX]; the UE determines the implicit channel resource on a UL PCC through dispatching a minimum CCE number of a PDCCH on a DL PCC of codeword 0, such implicit channel resource is taken as the implicit channel resource corresponding to the DL PCC in an ACK/NACK mapping table, namely the first channel resource, $n_{PUCCH,0}^{(1)}$ as shown in Table 2; then the UE determines that the channel resource of ACK/NACK feedback information to be fed back refers to the first channel resource (namely the first implicit channel resource corresponding to a DL PCC) corresponding to the modulation symbol, "−1" in accordance with an ACK/NACK mapping table; finally, the UE sends the modulation symbol, "−1" on the implicit channel resource determined in accordance with the minimum CCE number of a PDCCH of dispatching codeword 0;

Base station end: A base station only dispatches one codeword 0 on a DL PCC, so the base station receives ACK/NACK feedback information with PUCCH format 1a; since the channel resource of a PUCCH format 1a refers to the implicit channel resource on a UL PCC corresponding to a minimum CCE number of PDCCH dispatching codeword 0 and the modulation symbol corresponding to ACK in PUCCH format 1a refers to "−1", that is to say, UE shares the same transmission channel and transmission modulation symbol with the base station actually, fuzziness does not exist; the base station detects channel resource of PUCCH format 1a (viz. the implicit channel resource on a UL PCC corresponding to a minimum CCE number of PDCCH dispatching codeword 0) and modulation symbol "−1" sent by the UE can be acquired, viz. feedback information ACK of codeword 0 sent by the UE can be obtained.

Figure 1:
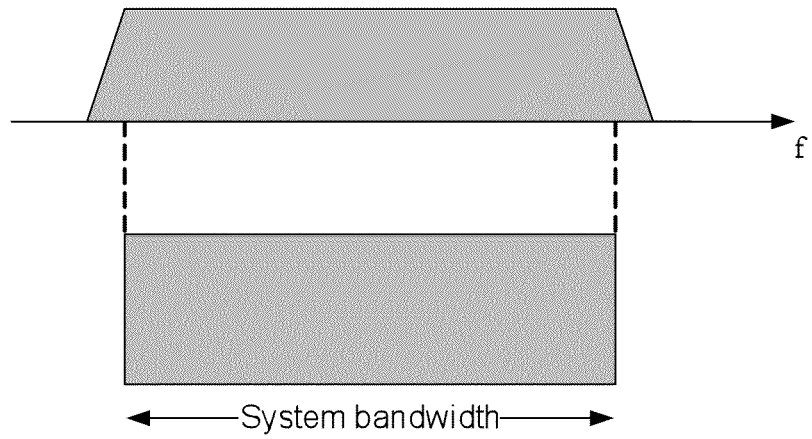
FIG. 1 is a schematic diagram of a single spectrum system in the prior art.
Figure 2:
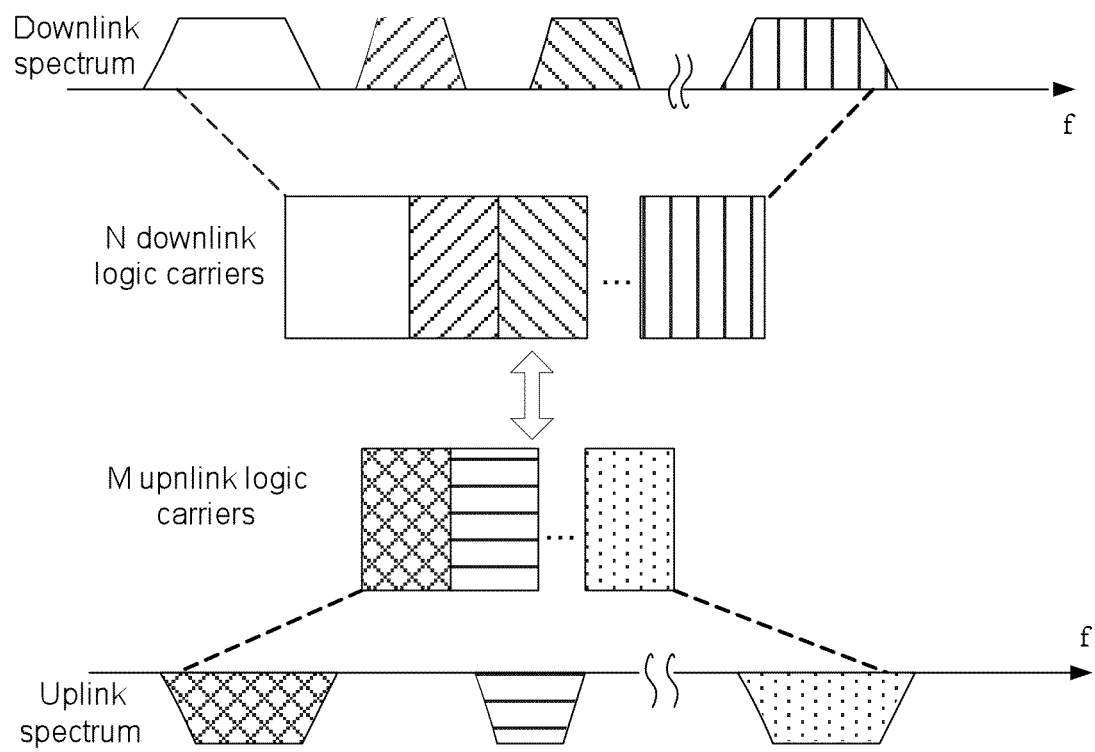
FIG. 2 is a schematic diagram of a spectrum aggregation system in the prior art.
Figure 6A:
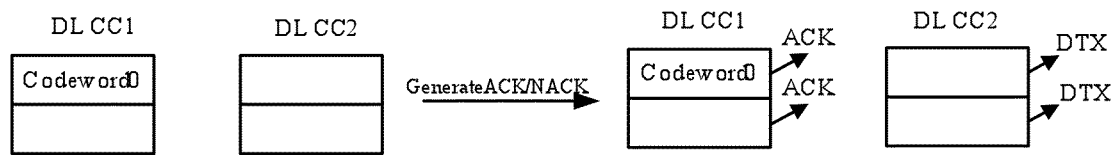
FIG. 6A is a flow diagram of a method for transmitting ACK/NACK feedback information in application scene III proposed by the embodiments of the present invention.

Application scene III: During DL CC reconfiguration, 2 DL CCs to 1 DL CC is reconfigured for UE. As shown in the site of FIG. 6A, 2 DL CCs is configured for the UE initially. DL CC1 refers to a DL PCC, which is transmitted in multi-codeword mode. DL CC2 refers to a DL SCC, which is transmitted in multi-codeword mode. An eNB only dispatches codeword 0 through bearing a PDCCH of DCI format 2, DCI format 2A, DCI format 2B or DCI format 2C on a DL PCC. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 4-bit ACK/NACK in accordance with the configuration of 2 DLCCs and the transmission mode of each DL CC; ACK/NACK feedback information of codeword 0 acquired by the UE on a DL PCC refers to ACK, then such information is repeated as the feedback information of the non-dispatched codeword 1, that is to say, the feedback information corresponding to codeword 1 also refers to ACK; if the UE cannot detect data packets on a DL SCC, ACK/NACK feedback information generated for the DL SCC refers to 2 DTXs and 4-bit ACK/NACK feedback information generated by the UE finally refers to [ACK, ACK, DTX]; the UE determines the implicit channel resource on a UL PCC through dispatching a minimum CCE number of a PDCCH on a DL PCC of codeword 0, such implicit channel resource is taken as the implicit channel resource corresponding to the DL PCC in an ACK/NACK mapping table, namely the first channel resource, $n_{PUCCH,0}^{(1)}$ as shown in Table 3; then the UE determines that the channel resource of ACK/NACK feedback information to be fed back refers to the first channel resource (namely the first implicit channel resource corresponding to a DL PCC) corresponding to the modulation symbol, "−1" in accordance with an ACK/NACK mapping table; finally, the UE sends the modulation symbol, "−1" on the implicit channel resource determined in accordance with the minimum CCE number of a PDCCH of dispatching codeword 0;

Base station end: A base station only dispatches one codeword 0 on a DL PCC, so the base station receives ACK/NACK feedback information with PUCCH format 1a; since the channel resource of PUCCH format 1a refers to the implicit channel resource on a UL PCC corresponding to a minimum CCE number of PDCCH dispatching codeword 0 and modulation symbol corresponding to ACK in PUCCH format 1a refers to "−1", that is to say, UE shares the same transmission channel and transmission modulation symbol with the base station actually, and fuzziness does not exist; the base station detects channel resource of PUCCH format 1a (viz. the implicit channel resource on a UL PCC corresponding to a minimum CCE number of PDCCH dispatching codeword 0) and modulation symbol "−1" sent by the UE can be acquired, viz. feedback information ACK of codeword 0 sent by the UE can be obtained.

Figure 6B:
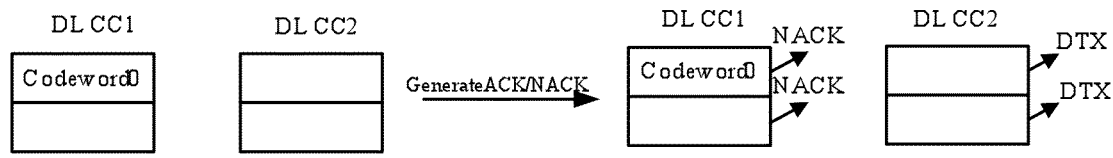
FIG. 6B is a flow diagram of a method for transmitting ACK/NACK feedback information in application scene IV proposed by the embodiments of the present invention.

Application scene IV: During DL CC reconfiguration, 2 DL CCs to 1 DL CC is reconfigured for UE. As shown in the site of FIG. 6B, DL CC1 refers to a DL PCC, which is transmitted in multi-codeword mode. DL CC2 refers to a DL SCC, which is transmitted in single-codeword mode. An eNB only dispatches codeword 0 through bearing a PDCCH of DCI format 1A. Transmission process of ACK/NACK is as follows:

UE end: Within the period that reconfiguration is ineffective, UE still runs based on the configuration of 2DL CCs and transmits ACK/NACK with a PUCCH format 1b with channel selection scheme, that is to say, the UE determines that it is necessary to feed back 4-bit ACK/NACK in accordance with the configuration of 2 DLCCs and the transmission mode of each DL CC; ACK/NACK feedback information of codeword 0 acquired by the UE on a DL PCC refers to NACK, then such information is repeated as the feedback information of the non-dispatched codeword 1, that is to say, the feedback information corresponding to codeword 1 also refers to NACK; if the UE cannot detect data packets on a DL SCC, ACK/NACK feedback information generated for the DL SCC refers to 2 DTXs and 4-bit ACK/NACK feedback information generated by the UE finally refers to [NACK,NACK,DTX, DTX]; the UE determines the implicit channel resource on a UL PCC through dispatching a minimum CCE number of a PDCCH on a DL PCC of codeword 0, such implicit channel resource is taken as the implicit channel resource corresponding to the DL PCC in an ACK/NACK mapping table, namely the first channel resource, $n_{PUCCH,0}^{(1)}$ as shown in Table 3; then the UE determines that the channel resource of ACK/NACK feedback information to be fed back refers to the first channel resource (namely the first implicit channel resource corresponding to a DL PCC) corresponding to the modulation symbol, "1" in accordance with an ACK/NACK mapping table; finally, the UE sends the modulation symbol, "1" on the implicit channel resource determined in accordance with the minimum CCE number of a PDCCH of dispatching codeword 0;

Base station end: the base station only dispatches one codeword 0 at DL PCC, so the base station receives ACK/NACK feedback information with PUCCH format 1a. Since channel resource of PUCCH format 1a refers to the implicit channel resource on a UL PCC corresponding to a minimum CCE number of PDCCH dispatching codeword 0 and modulation symbol corresponding to ACK in PUCCH format 1a also refers to "1", that is to say, UE shares the same transmission channel and transmission modulation symbol with the base station actually, and fuzziness does not exist. The base station detects channel resource of PUCCH format 1a (viz. the implicit channel resource on a UL PCC corresponding to a minimum CCE number of PDCCH dispatching codeword 0) and modulation symbol "1" sent by UE can be acquired, viz. feedback information NACK of codeword 0 sent by UE can be obtained.

Figure 7:
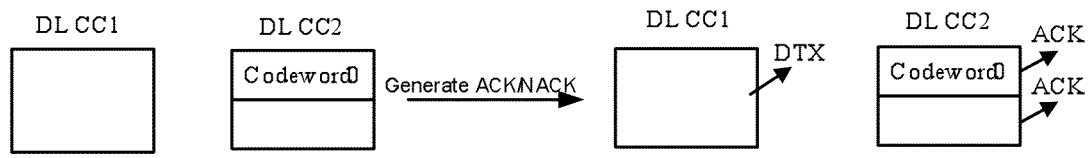
FIG. 7 is a flow diagram of a method for transmitting ACK/NACK feedback information in application scene V proposed by the embodiments of the present invention.

Application scene V: During DL CC reconfiguration, 2 DL CCs to 1 DL CC is reconfigured for UE. As shown in the site of FIG. 7, DL CC1 refers to a DL PCC, which is transmitted in single-codeword mode. DL CC2 refers to a DL SCC, which is transmitted in multi-codeword mode. An eNB only dispatches codeword 0 on a DL SCC through bearing a PDCCH inter-carrier of DCI format 2, DCI format 2A, DCI format 2B or DCI format 2C or DCI format 1A on a DL PCC. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 3-bit ACK/NACK in accordance with the configuration of 2 DLCCs and the transmission mode of each DL CC; ACK/NACK feedback information of codeword 0 acquired by the UE on a DL PCC refers to ACK, then such information is repeated as the feedback information of the non-dispatched codeword 1, that is to say, the feedback information corresponding to codeword 1 also refers to ACK; if the UE cannot detect data packets on a DL SCC, ACK/NACK feedback information generated for the DL SCC refers to 1 DTX and 3-bit ACK/NACK feedback information generated by the UE finally refers to [ACK, ACK, DTX] (for 3-bit transmission, ACK/NACK feedback information of a DL CC configured as multi-codeword transmission mode is placed in front of feedback information sequence, that is to say, such information corresponds to the first two ACK/NACK feedback statues in an ACK/NACK mapping table); the UE determines the implicit channel resource on a UL PCC through dispatching a minimum CCE number of a PDCCH on a DL PCC of codeword 0, such implicit channel resource is taken as the implicit channel resource corresponding to the DL SCC in an ACK/NACK mapping table, namely the first channel resource, $n_{PUCCH,0}^{(1)}$ as shown in Table 3; then the UE determines that the channel resource of ACK/NACK feedback information to be fed back refers to the first channel resource (namely the implicit channel resource corresponding to a DL SCC) corresponding to the modulation symbol, "−1" in accordance with an ACK/NACK mapping table; finally, the UE sends the modulation symbol, "−1" on the implicit channel resource determined in accordance with the minimum CCE number of a PDCCH of throughout codeword 0;

Base station end: The base station only dispatches one codeword 0 at DL SCC, so the base station receives ACK/NACK feedback information by using PUCCH format 1a. Since channel resource of PUCCH format 1a refers to the implicit channel resource on a UL PCC corresponding to a minimum CCE number of PDCCH dispatching codeword 0 and modulation symbol corresponding to ACK in PUCCH format 1a also refers to "−1", that is to say, UE shares the same transmission channel and transmission modulation symbol with the base station actually, and fuzziness problem does not exist. The base station detects channel resource of PUCCH format 1a (viz. the implicit channel resource on UL PCC corresponding to a minimum CCE number of PDCCH dispatching codeword 0) and modulation symbol "−1" sent by UE can be acquired, viz. feedback information ACK of codeword 0 on a DL SCC sent by UE can be obtained.

Figure 8:
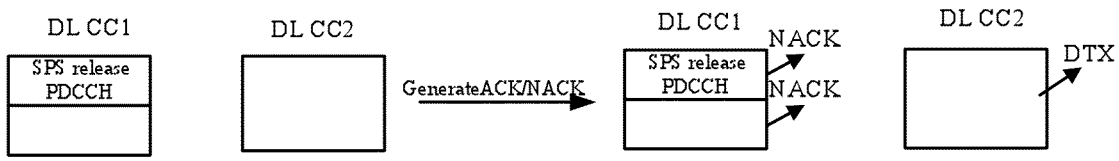
FIG. 8 is a flow diagram of a method for transmitting ACK/NACK feedback information in application scene VI proposed by the embodiments of the present invention.

Application scene VI: During DL CC reconfiguration, 2 DL CCs to 1 DL CC is reconfigured for UE. As shown in the site of FIG. 8, DL CC1 refers to a DL PCC, which is transmitted in multi-codeword mode. DL CC2 refers to a DL SCC, which is transmitted in single-codeword mode. An eNB only transmits one PDCCH indicating downlink SPS resource release (SPS release PDCCH) on a DL PCC. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 3-bit ACK/NACK in accordance with the configuration of 2 DLCCs and the transmission mode of each DL CC; ACK/NACK feedback information of a PDCCH indicating downlink SPS resource release refers to NACK, then such information is repeated to 2 bits as ACK/NACK feedback information of a DL PCC, that is to say, such PDCCH is always processed as codeword 0 in multi-codeword transmission modes, feedback information corresponding to the position of non-dispatched codeword 1 is obtained through repetition, that is to say, feedback information corresponding to the position of codeword 1 also refers to NACK; if the UE cannot detect data packets on a DL SCC, ACK/NACK feedback information generated for the DL SCC refers to DTX and 3-bit ACK/NACK feedback information generated by the UE finally refers to [NACK,NACK,DTX]; the UE determines the implicit channel resource on a UL PCC through a minimum CCE number of a PDCCH indicating downlink SPS resource release received on a DL PCC, such implicit channel resource is taken as the implicit channel resource corresponding to the DL PCC in an ACK/NACK mapping table, namely the first channel resource, $n_{PUCCH,0}^{(1)}$ as shown in Table 2; then the UE determines that the channel resource of ACK/NACK feedback information to be fed back refers to the first channel resource (namely the first implicit channel resource corresponding to a DL PCC) corresponding to the modulation symbol, "1" in accordance with an ACK/NACK mapping table; finally, the UE sends the modulation symbol, "1" on the implicit channel resource determined in accordance with the minimum CCE number of PDCCH indicating downlink SPS resource release;

Base station end: A base station only sends one PDCCH indicating downlink SPS resource release, so the base station receives ACK/NACK feedback information with PUCCH format 1a; since the channel resource of a PUCCH format 1a refers to the implicit channel resource on a UL PCC corresponding to a minimum CCE number of the PDCCH indicating downlink SPS resource release and the modulation symbol corresponding to NACK in PUCCH format 1a also refers to "1", that is to say, UE shares the same transmission channel and transmission modulation symbol with the base station actually, fuzziness does not exist; the base station detects channel resource of PUCCH format 1a (viz. the implicit channel resource on a UL PCC corresponding to a minimum CCE number of the PDCCH indicating downlink SPS resource release) and modulation symbol "1" sent by the UE can be acquired, viz. feedback information NACK of the PDCCH indicating downlink SPS resource release sent by the UE can be obtained.

Figure 9:
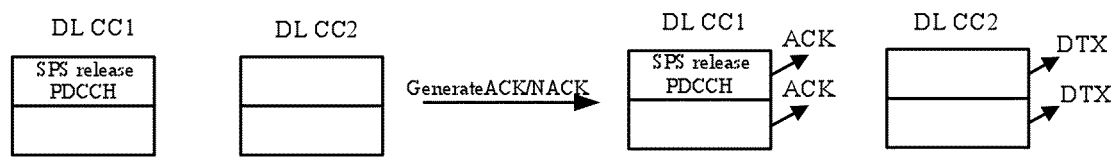
FIG. 9 is a flow diagram of a method for transmitting ACK/NACK feedback information in application scene VII proposed by the embodiments of the present invention.

Application scene VII: During DL CC reconfiguration, 2 DL CCs to 1 DL CC is reconfigured for UE. As shown in the site of FIG. 9, DL CC1 refers to a DL PCC, which is transmitted in multi-codeword mode. DL CC2 refers to a DL SCC, which is transmitted in multi-codeword mode. An eNB only transmits one PDCCH indicating downlink SPS resource release on a DL PCC. Transmission process of ACK/NACK is as follows:

UE end: Within the period that reconfiguration is ineffective, UE still runs based on the configuration of 2 DLCCs and transmits ACK/NACK with a PUCCH format 1b with channel selection scheme, that is to say, the UE determines that it is necessary to feed back 4-bit ACK/NACK in accordance with the configuration of 2 DLCCs and the transmission mode of each DL CC; ACK/NACK feedback information of a PDCCH indicating downlink SPS resource release refers to ACK, then such information is repeated to 2 bits as ACK/NACK feedback information of a DL PCC, that is to say, such PDCCH is always processed as codeword 0 in multi-codeword transmission modes, feedback information corresponding to the position of non-dispatched codeword 1 is obtained through repetition, that is to say, feedback information corresponding to the position of codeword 1 also refers to ACK; if the UE cannot detect data packets on a DL SCC, ACK/NACK feedback information generated for the DL SCC refers to DTX and 4-bit ACK/NACK feedback information generated by the UE finally refers to [ACK, ACK, DTX, DTX]; the UE determines the implicit channel resource on a UL PCC through a minimum CCE number of a PDCCH indicating downlink SPS resource release received on a DL PCC, such implicit channel resource is taken as the implicit channel resource corresponding to the DL PCC in an ACK/NACK mapping table, namely the first channel resource, $n_{PUCCH,0}^{(1)}$ as shown in Table 3; then the UE determines that the channel resource of ACK/NACK feedback information to be fed back refers to the first channel resource (namely the first implicit channel resource corresponding to a DL PCC) corresponding to the modulation symbol, "−1" in accordance with an ACK/NACK mapping table; finally, the UE sends the modulation symbol, "−1" on the implicit channel resource determined in accordance with the minimum CCE number of PDCCH indicating downlink SPS resource release;

Base station end: A base station only sends one PDCCH indicating downlink SPS resource release on DL PCC, so the base station receives ACK/NACK feedback information with PUCCH format 1a; since the channel resource of a PUCCH format 1a refers to the implicit channel resource on a UL PCC corresponding to a minimum CCE number of the PDCCH indicating downlink SPS resource release and the modulation symbol corresponding to ACK in PUCCH format 1a also refers to "−1", that is to say, UE shares the same transmission channel and transmission modulation symbol with the base station actually, fuzziness does not exist; the base station detects channel resource of PUCCH format 1a (viz. the implicit channel resource on a UL PCC corresponding to a minimum CCE number of the PDCCH indicating downlink SPS resource release) and modulation symbol "−1" sent by the UE can be acquired, viz. feedback information ACK of the PDCCH indicating downlink SPS resource release sent by the UE can be obtained.

Compared with prior art, the embodiments of the present invention have the following advantages:

By applying the technical solution of the present invention, when ACK/NACK feedback information is transmitted based on an ACK/NACK mapping table with a PUCCH format 1b with channel selection scheme, the problem of inconsistent detection results due to inconformity of the transmission scheme by a base station and a user equipment (UE) in the process of feeding back the ACK/NACK feedback information can be avoided, so as to implement a rollback of LTE Rel-8 PUCCH format 1a/1b.

Figure 10:
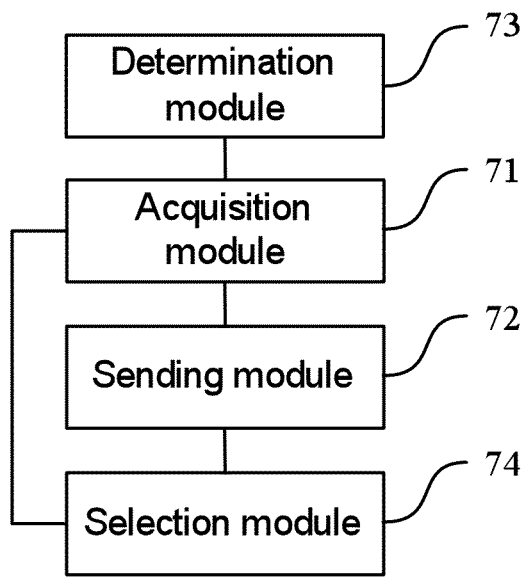
FIG. 10 is a structure diagram of UE proposed by the embodiments of the present invention.

To implement the technical solution of the present invention, the embodiments of the present invention also provide UE, whose structure diagram is shown in FIG. 10, which comprises:

Acquisition module 71, which is used to acquire 1 bit of ACK/NACK feedback information of one codeword received when user equipment receives only one codeword on a downlink main component carrier configured as multi-codeword transmission mode and repeat the 1 bit of ACK/NACK feedback information into 2 bits to serve as the ACK/NACK feedback bit corresponding to the downlink main component carrier, and acquire the ACK/NACK feedback bit corresponding to downlink auxiliary component carrier of each configuration;

Wherein, one codeword includes one-codeword transmission of dynamic scheduling and PDCCH transmission indicating downlink semi-persistent scheduling (SPS) resource release, that is to say, when UE receives only one PDCCH indicating downlink SPS resource release on downlink main component carriers configured as multi-codeword transmission mode, one codeword mentioned above is equivalent to such PDCCH. The UE receives 1-bit ACK/NACK feedback information of the PDCCH indicating downlink SPS resource release, and repeat the 1-bit ACK/NACK feedback information to 2 bits as ACK/NACK feedback bits corresponding to downlink main component carriers.

Sending module 72, which is used to send ACK/NACK feedback bits corresponding to downlink component carriers of each configuration acquired by the acquisition module 71.

In specific application scenes, the UE also includes determination module 73, which is used to determine the number of ACK/NACK feedback bits to be fed back, wherein, the sum of the number of ACK/NACK feedback bits corresponding to each downlink auxiliary component carrier and the number of 2-bit ACK/NACK feedback bits corresponding to the downlink main component carriers is equal to the number of ACK/NACK feedback bits to be fed back determined by the determination module, which comprises:

As for a FDD system, the number of ACK/NACK feedback bit to be fed back is determined in accordance with the quantity of downlink component carriers configured and transmission mode of downlink carriers of each configuration;

For a TDD system, the number of ACK/NACK feedback bit to be fed back is determined in accordance with the quantity of downlink component carriers configured and downlink subframes of ACK/NACK feedback information to be fed back corresponding to an uplink subframe and transmission mode of downlink component carriers of each configuration.

Furthermore, acquisition module 71 is also used to acquire a candidate channel resource, which at least comprises a dynamic channel resource corresponding to a PDCCH which dispatches downlink main component carriers.

Acquisition module 71, which is also used to determines a dynamic channel resource in accordance with a minimum CCE number of a PDCCH which dispatches downlink main component carriers. Wherein, the PDCCH which dispatches downlink main component carriers comprises the one transmitted by dynamic scheduling data and indicating downlink SPS resource release.

Besides, the UE also includes selection module 74, which is used to take a dynamic channel resource acquired by acquisition module 71 in accordance with a minimum CCE number of a PDCCH which dispatches downlink main component carriers as the first dynamic channel resource corresponding to downlink main component carriers among candidate channel resources used for channel selection by UE, that is to say, such dynamic channel resource is taken as the first channel resource among candicate channel resources used for channel selection. It should be pointed out that selection module 74 is also used to determines a corresponding channel resource and modulation symbol among candidate channel resources in accordance with ACK/NACK feedback bits corresponding to downlink component carriers of each configuration acquired by acquisition module 71 when UE transmits ACK/NACK feedback information with a PUCCH format 1b with channel selection;

Sending module 72, which is specifically used to send modulation symbol on corresponding channel resources selected by selection module 74.

It should be further noted that acquisition module 71 acquires ACK/NACK feedback bits corresponding to downlink auxiliary component carriers of each configuration, which comprises:

The acquisition module 71 generates NACK or DTX feedback bits for downlink auxiliary component carriers without codeword of each configuration; or, Acquires 1-bit ACK/NACK feedback information of one received codeword when only one codeword is received on downlink auxiliary component carriers configured as multi-codeword transmission mode, and repeat such information to 2 bits as ACK/NACK feedback bits of downlink auxiliary component carriers.

Compared with prior art, the embodiments of the present invention have the following advantages:

By applying the technical solution of the present invention, when ACK/NACK feedback information is transmitted based on an ACK/NACK mapping table with a PUCCH format 1b with channel selection scheme, the problem of inconsistent detection results due to inconformity of the transmission scheme by a base station and a user equipment (UE) in the process of feeding back the ACK/NACK feedback information can be avoided, so as to implement a rollback of LTE Rel-8 PUCCH format 1a/1b.

With the description of the preferred embodiments hereinabove, those skilled in the art can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the prior art can be reflected in the form of a software product, which is saved in a memory medium comprising instructions to enable a user equipment, which could be a personal computer, a server or a network device, to carry out the methods for each embodiment of the present invention.

Technical personnel of the field can understand that the drawings only refer to the diagram of a preferred embodiment, and the module or procedure is unnecessary for the implementation of the embodiments of the present invention.

Technical personnel of the field can understand that the module in the unit of an embodiment can be distributed in such unit based on embodiment description, or located in one or more units of another embodiment through corresponding changes. Modules of the embodiments mentioned above can be merged into one module, or further divided into a plurality of submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method for transmitting multi-bit acknowledgement/negative acknowledgement (ACK/NACK) feedback information, which comprises:
   when user equipment (UE) receives only one code word on a downlink of main component carriers configured in multi-code word transmission mode, the UE acquires 1-bit ACK/NACK feedback information in accordance with one received code word and repeats such information to 2 bits as ACK/NACK feedback bits of a downlink of main component carriers;
   the UE acquires the ACK/NACK feedback bit corresponding to downlink auxiliary component carriers of each configuration;
   the UE sends the ACK/NACK feedback bit corresponding to the downlink component carriers of each configuration.

2. The method as claimed in claim 1, which also comprises:
   the UE determines the number of ACK/NACK feedback bits to be fed back, wherein, the sum of the number of ACK/NACK feedback bits corresponding to each downlink auxiliary component carrier and 2-bit ACK/NACK feedback bits corresponding to each downlink main component carrier is equal to the number of ACK/NACK feedback bits to be fed back by the UE.

3. The method as claimed in claim 2, wherein the UE determines a method of the number of ACK/NACK feedback bits to be fed back, which comprises:
   for a frequency division duplex (FDD) system, the UE determines the number of ACK/NACK feedback bits to be fed back in accordance with the quantity of downlink component carriers configured and transmission mode of downlink carriers of each configuration;
   for a time division duplex (TDD) system, the UE determines the number of ACK/NACK feedback bits to be fed back in accordance with the quantity of downlink component carriers configured and downlink subframes of ACK/NACK feedback bits to be fed back corresponding to an uplink subframe as well as transmission mode of downlink carriers of each configuration.

4. The method as claimed in claim 1, wherein the UE acquires ACK/NACK feedback bits corresponding to downlink auxiliary carriers of each configuration, which comprises:

the UE generates NACK or discontinuous transmission (DTX) feedback bits for a downlink auxiliary component carrier without a code word of each configuration; or, when the UE receives only one code word on downlink auxiliary component carriers configured as a multi-code word transmission mode, the UE acquires 1-bit ACK/NACK feedback information in accordance with one received code word and repeats such information to 2 bits as ACK/NACK feedback bits of downlink auxiliary component carriers.

5. The method as claimed in claim 1, wherein the UE sends the acquired ACK/NACK feedback bits corresponding to downlink carriers of each configuration, which comprises:

the UE determines one channel resource and corresponding modulation symbols among candidate channel resources according to the acquired ACK/NACK feedback bits corresponding to downlink component carriers of each configuration with a physical uplink control channel (PUCCH) format 1b with a channel selection scheme;

the UE sends the modulation symbols on one determined channel resource.

6. The method as claimed in claim 5, which also comprises:

the candidate channel resource at least comprises one dynamic channel resource corresponding to a physical downlink control channel which dispatches downlink main component carriers.

7. The method as claimed in claim 6, wherein the dynamic channel resource corresponding to a physical downlink control channel (PDCCH) which dispatches downlink main component carriers comprises:

the dynamic channel resource corresponds to a minimum control channel element (CCE) number of the PDCCH.

8. The UE as claimed in claim 7, wherein the UE takes the dynamic channel resource corresponding to a CCE minimum number of the PDCCH as the first dynamic channel resource corresponding to downlink main component carriers among candidate channel resources used for channel selection.

9. User equipment (UE), which comprises:

an acquisition module, used to acquire 1-bit acknowledgement/negative acknowledgement (ACK/NACK) feedback information in accordance with one received code word when the UE receives only one code word on downlink main component carriers configured as a multi-code word transmission mode, and repeats such information to 2 bits as ACK/NACK feedback bits corresponding to downlink main component carriers, and acquires ACK/NACK feedback bits corresponding to downlink auxiliary component carriers of each configuration; and a sending module, used to send ACK/NACK feedback bits corresponding to downlink component carriers of each configuration acquired by the acquisition module.

10. The UE as claimed in claim 9, which also comprises a determination module, used to determine the number of ACK/NACK feedback bits to be fed back, wherein, the sum of the number of ACK/NACK feedback bits corresponding to each downlink auxiliary component carrier and 2-bit ACK/NACK feedback bits corresponding to the downlink main component carriers is equal to the number of ACK/NACK feedback bits to be fed back, which comprises:

for a frequency division duplex (FDD) system, the number of ACK/NACK feedback bits to be fed back is determined in accordance with the quantity of downlink component carriers configured and the transmission mode of downlink carriers of each configuration;

for a time division duplex (TDD) system, the number of ACK/NACK feedback bits to be fed back is determined in accordance with the quantity of downlink component carriers configured and downlink subframes of ACK/NACK feedback bits to be fed back corresponding to a uplink subframe as well as transmission mode of downlink carriers of each configuration.

11. The UE as claimed in claim 9, wherein the acquisition module is also used to acquire candidate channel resources, the candidate channel resources at least comprise one dynamic channel resource corresponding to a physical downlink control channel (PDCCH) which dispatches the downlink main component carriers.

12. The UE as claimed in claim 11, wherein the acquisition module is also used to determine a dynamic channel resource in accordance with a minimum control channel element (CCE) number of the PDCCH which dispatches the downlink main component carriers.

13. The UE as claimed in claim 12, which also comprises a selection module, used to take a dynamic channel resource acquired by the acquisition module in accordance with the minimum CCE number of the PDCCH which dispatches downlink main component carriers as the first dynamic channel resource corresponding to downlink main component carriers used for channel selection by the UE.

14. The UE as claimed in claim 13, wherein the selection module is also used to determine a corresponding channel resource and module symbol among candidate channel resources acquired by the acquisition module in accordance with ACK/NACK feedback bits corresponding to downlink main components carriers of each configuration acquired by the acquisition module;

the sending module sends the modulation symbol on corresponding channel resources selected by the selection module.

15. The UE as claimed in claim 9, wherein the acquisition module acquires ACK/NACK feedback bits corresponding to downlink auxiliary components carriers of each configuration, which also comprises:

the acquisition module generates NACK or discontinuous transmission (DTX) feedback bits for downlink auxiliary component carrier without code word of each configuration; or, when the UE receives only one code word on downlink auxiliary component carriers configured as multi-code word transmission mode, the acquisition module acquires 1-bit ACK/NACK feedback information of one received code word and repeats such information to 2 bits as ACK/NACK feedback bits of the downlink auxiliary component carriers.

* * * * *